(12) United States Patent
Gravois et al.

(10) Patent No.: US 9,311,746 B2
(45) Date of Patent: Apr. 12, 2016

(54) SYSTEMS AND METHODS FOR GENERATING A 3-D MODEL OF A VIRTUAL TRY-ON PRODUCT

(71) Applicant: Glasses.com Inc.

(72) Inventors: Adam Gravois, Austin, TX (US); Ryan Engle, Pflugerville, TX (US)

(73) Assignee: Glasses.com Inc., Mason, OH (US)

( * ) Notice: Subject to any disclaimer, the term of this patent is extended or adjusted under 35 U.S.C. 154(b) by 90 days.

(21) Appl. No.: 13/774,985

(22) Filed: Feb. 22, 2013

(65) Prior Publication Data

US 2013/0314412 A1    Nov. 28, 2013

Related U.S. Application Data

(60) Provisional application No. 61/650,983, filed on May 23, 2012, provisional application No. 61/735,951, filed on Dec. 11, 2012.

(51) Int. Cl.
*G06T 17/00* (2006.01)
*G06T 19/00* (2011.01)
*G06K 9/00* (2006.01)
(Continued)

(52) U.S. Cl.
CPC ............ *G06T 17/00* (2013.01); *G06K 9/00221* (2013.01); *G06K 9/46* (2013.01); *G06T 15/04* (2013.01); *G06T 19/00* (2013.01);
(Continued)

(58) Field of Classification Search
CPC ....... G06T 17/00; G06T 19/006; G06T 15/04; G06T 15/205; G06T 19/00; G06T 2200/08; G06T 7/0097; G06K 9/46; G06K 9/00221; G06Q 30/0643; G06Q 30/00; A41D 31/0088
USPC .................................................. 345/419, 420
See application file for complete search history.

(56) References Cited

U.S. PATENT DOCUMENTS 3,927,933 A    12/1975  Humphrey
4,370,058 A     1/1983  Trötscher et al.
(Continued)

FOREIGN PATENT DOCUMENTS

DE    10007705 A1    9/2001
EP     0092364 A1   10/1983
(Continued)

OTHER PUBLICATIONS

Ron O. Dror et al., Recognition of Surface Reflectance Properties from a Single Image under Unknown Real-World Illumination, Dec. 2001, IEEE, Proceedings of the IEEE Workshop on Identifying Objects Across Variations in Lighting: Psychophysics & Computation.*

(Continued)

*Primary Examiner* — Ming Hon
*Assistant Examiner* — Phuc Doan
(74) *Attorney, Agent, or Firm* — Holland & Hart LLP

(57) ABSTRACT

A computer-implemented method for generating a three-dimensional (3-D) model of a virtual try-on product. At least a portion of an object is scanned. The object includes at least first and second surfaces. An aspect of the first surface is detected. An aspect of the second surface is detected, the aspect of the second surface being different from the aspect of the first surface. A polygon mesh of the first and second surfaces is generated from the scan of the object.

16 Claims, 10 Drawing Sheets

(51) Int. Cl.
*G06K 9/46* (2006.01)
*G06T 15/04* (2011.01)
*G02C 13/00* (2006.01)

(52) U.S. Cl.
CPC ............ *G06T 19/006* (2013.01); *G02C 13/003* (2013.01); *G06T 2210/16* (2013.01)

(56) References Cited

U.S. PATENT DOCUMENTS

| | | |
|---|---|---|
| 4,467,349 A | 8/1984 | Maloomian |
| 4,522,474 A | 6/1985 | Slavin |
| 4,534,650 A | 8/1985 | Clerget et al. |
| 4,539,585 A | 9/1985 | Spackova et al. |
| 4,573,121 A | 2/1986 | Saigo et al. |
| 4,613,219 A | 9/1986 | Vogel |
| 4,698,564 A | 10/1987 | Slavin |
| 4,724,617 A | 2/1988 | Logan et al. |
| 4,730,260 A | 3/1988 | Mori et al. |
| 4,781,452 A | 11/1988 | Ace |
| 4,786,160 A | 11/1988 | Fürter |
| 4,845,641 A | 7/1989 | Ninomiya et al. |
| 4,852,184 A | 7/1989 | Tamura et al. |
| 4,957,369 A | 9/1990 | Antonsson |
| 5,139,373 A | 8/1992 | Logan et al. |
| 5,255,352 A | 10/1993 | Falk |
| 5,257,198 A | 10/1993 | van Schoyck |
| 5,280,570 A | 1/1994 | Jordan |
| 5,281,957 A | 1/1994 | Schoolman |
| 5,428,448 A | 6/1995 | Albert-Garcia |
| 5,485,399 A | 1/1996 | Saigo et al. |
| 5,550,602 A | 8/1996 | Braeuning |
| 5,592,248 A | 1/1997 | Norton et al. |
| 5,631,718 A | 5/1997 | Markovitz et al. |
| 5,666,957 A | 9/1997 | Juto |
| 5,682,210 A | 10/1997 | Weirich |
| 5,720,649 A | 2/1998 | Gerber et al. |
| 5,724,522 A | 3/1998 | Kagami et al. |
| 5,774,129 A | 6/1998 | Poggio et al. |
| 5,809,580 A | 9/1998 | Arnette |
| 5,844,573 A | 12/1998 | Poggio et al. |
| 5,880,806 A | 3/1999 | Conway |
| 5,908,348 A | 6/1999 | Gottschald |
| 5,974,400 A | 10/1999 | Kagami et al. |
| 5,980,037 A | 11/1999 | Conway |
| 5,983,201 A | 11/1999 | Fay |
| 5,987,702 A | 11/1999 | Simioni |
| 5,988,862 A | 11/1999 | Kacyra et al. |
| D417,883 S | 12/1999 | Arnette |
| 6,016,150 A | 1/2000 | Lengyel et al. |
| 6,018,339 A | 1/2000 | Stevens |
| D420,037 S | 2/2000 | Conway |
| D420,379 S | 2/2000 | Conway |
| D420,380 S | 2/2000 | Simioni et al. |
| 6,024,444 A | 2/2000 | Little |
| D421,764 S | 3/2000 | Arnette |
| D422,011 S | 3/2000 | Conway |
| D422,014 S | 3/2000 | Simioni et al. |
| D423,034 S | 4/2000 | Arnette |
| D423,552 S | 4/2000 | Flanagan et al. |
| D423,553 S | 4/2000 | Brune |
| D423,554 S | 4/2000 | Conway |
| D423,556 S | 4/2000 | Conway |
| D423,557 S | 4/2000 | Conway |
| D424,094 S | 5/2000 | Conway |
| D424,095 S | 5/2000 | Brune et al. |
| D424,096 S | 5/2000 | Conway |
| D424,589 S | 5/2000 | Arnette |
| D424,598 S | 5/2000 | Simioni |
| D425,542 S | 5/2000 | Arnette |
| D425,543 S | 5/2000 | Brune |
| D426,568 S | 6/2000 | Conway |
| D427,225 S | 6/2000 | Arnette |
| D427,227 S | 6/2000 | Conway |
| 6,072,496 A | 6/2000 | Guenter et al. |
| 6,095,650 A | 8/2000 | Gao et al. |
| 6,102,539 A | 8/2000 | Tucker |
| D430,591 S | 9/2000 | Arnette |
| D432,156 S | 10/2000 | Conway et al. |
| D433,052 S | 10/2000 | Flanagan |
| 6,132,044 A | 10/2000 | Sternbergh |
| 6,139,141 A | 10/2000 | Zider |
| 6,139,143 A | 10/2000 | Brune et al. |
| 6,142,628 A | 11/2000 | Saigo |
| 6,144,388 A * | 11/2000 | Bornstein ..................... 345/629 |
| D434,788 S | 12/2000 | Conway |
| D439,269 S | 3/2001 | Conway |
| 6,208,347 B1 | 3/2001 | Migdal et al. |
| 6,222,621 B1 | 4/2001 | Taguchi et al. |
| 6,231,188 B1 | 5/2001 | Gao et al. |
| 6,233,049 B1 | 5/2001 | Kondo et al. |
| 6,246,468 B1 | 6/2001 | Dimsdale |
| 6,249,600 B1 | 6/2001 | Reed et al. |
| 6,281,903 B1 | 8/2001 | Martin et al. |
| 6,305,656 B1 | 10/2001 | Wemyss |
| 6,307,568 B1 | 10/2001 | Rom |
| 6,310,627 B1 | 10/2001 | Sakaguchi |
| 6,330,523 B1 | 12/2001 | Kacyra et al. |
| 6,356,271 B1 | 3/2002 | Reiter et al. |
| 6,377,281 B1 | 4/2002 | Rosenbluth et al. |
| 6,386,562 B1 | 5/2002 | Kuo |
| 6,415,051 B1 | 7/2002 | Callari et al. |
| 6,419,549 B2 | 7/2002 | Shirayanagi |
| 6,420,698 B1 | 7/2002 | Dimsdale |
| 6,434,278 B1 | 8/2002 | Hashimoto |
| 6,456,287 B1 | 9/2002 | Kamen et al. |
| 6,466,205 B2 | 10/2002 | Simpson et al. |
| 6,473,079 B1 | 10/2002 | Kacyra et al. |
| 6,492,986 B1 | 12/2002 | Metaxas et al. |
| 6,493,073 B2 | 12/2002 | Epstein |
| 6,508,553 B2 | 1/2003 | Gao et al. |
| 6,512,518 B2 | 1/2003 | Dimsdale |
| 6,512,993 B2 | 1/2003 | Kacyra et al. |
| 6,516,099 B1 | 2/2003 | Davison et al. |
| 6,518,963 B1 | 2/2003 | Waupotitsch et al. |
| 6,527,731 B2 | 3/2003 | Weiss et al. |
| 6,529,192 B1 | 3/2003 | Waupotitsch |
| 6,529,626 B1 | 3/2003 | Watanabe et al. |
| 6,529,627 B1 | 3/2003 | Callari et al. |
| 6,533,418 B1 | 3/2003 | Izumitani et al. |
| 6,535,223 B1 | 3/2003 | Foley |
| 6,556,196 B1 | 4/2003 | Blanz et al. |
| 6,563,499 B1 | 5/2003 | Waupotitsch et al. |
| 6,583,792 B1 | 6/2003 | Agnew |
| 6,624,843 B2 | 9/2003 | Lennon |
| 6,634,754 B2 | 10/2003 | Fukuma et al. |
| 6,637,880 B1 | 10/2003 | Yamakaji et al. |
| 6,647,146 B1 | 11/2003 | Davison et al. |
| 6,650,324 B1 | 11/2003 | Junkins |
| 6,659,609 B2 | 12/2003 | Mothes |
| 6,661,433 B1 | 12/2003 | Lee |
| 6,664,956 B1 | 12/2003 | Erdem |
| 6,668,082 B1 | 12/2003 | Davison et al. |
| 6,671,538 B1 | 12/2003 | Ehnholm et al. |
| 6,677,946 B1 | 1/2004 | Ohba |
| 6,682,195 B2 | 1/2004 | Dreher |
| 6,692,127 B2 | 2/2004 | Abitbol et al. |
| 6,705,718 B2 | 3/2004 | Fossen |
| 6,726,463 B2 | 4/2004 | Foreman |
| 6,734,849 B2 | 5/2004 | Dimsdale et al. |
| 6,736,506 B2 | 5/2004 | Izumitani et al. |
| 6,760,488 B1 | 7/2004 | Moura et al. |
| 6,775,128 B2 | 8/2004 | Leitao |
| 6,785,585 B1 | 8/2004 | Gottschald |
| 6,791,584 B1 | 9/2004 | Xie |
| 6,792,401 B1 | 9/2004 | Nigro et al. |
| 6,807,290 B2 | 10/2004 | Liu et al. |
| 6,808,381 B2 | 10/2004 | Foreman et al. |
| 6,817,713 B2 | 11/2004 | Ueno |
| 6,825,838 B2 | 11/2004 | Smith et al. |
| 6,847,383 B2 | 1/2005 | Agnew |
| 6,847,462 B1 | 1/2005 | Kacyra et al. |
| 6,876,755 B1 | 4/2005 | Taylor et al. |
| 6,893,245 B2 | 5/2005 | Foreman et al. |

(56) References Cited

U.S. PATENT DOCUMENTS

| | | |
|---|---|---|
| 6,903,746 B2 | 6/2005 | Fukushima et al. |
| 6,907,310 B2 | 6/2005 | Gardner et al. |
| 6,922,494 B1 | 7/2005 | Fay |
| 6,943,789 B2 | 9/2005 | Perry et al. |
| 6,944,327 B1 | 9/2005 | Soatto |
| 6,950,804 B2 | 9/2005 | Strietzel |
| 6,961,439 B2 | 11/2005 | Ballas |
| 6,965,385 B2 | 11/2005 | Welk et al. |
| 6,965,846 B2 | 11/2005 | Krimmer |
| 6,968,075 B1 | 11/2005 | Chang |
| 6,980,690 B1 | 12/2005 | Taylor et al. |
| 6,999,073 B1 | 2/2006 | Zwern et al. |
| 7,003,515 B1 | 2/2006 | Glaser et al. |
| 7,016,824 B2 | 3/2006 | Waupotitsch et al. |
| 7,034,818 B2 | 4/2006 | Perry et al. |
| 7,043,059 B2 | 5/2006 | Cheatle et al. |
| 7,051,290 B2 | 5/2006 | Foreman et al. |
| 7,062,722 B1 | 6/2006 | Carlin et al. |
| 7,069,107 B2 | 6/2006 | Ueno |
| 7,095,878 B1 | 8/2006 | Taylor et al. |
| 7,103,211 B1 | 9/2006 | Medioni et al. |
| 7,116,804 B2 | 10/2006 | Murase et al. |
| 7,133,048 B2 | 11/2006 | Brand |
| 7,152,976 B2 | 12/2006 | Fukuma et al. |
| 7,154,529 B2 | 12/2006 | Hoke et al. |
| 7,156,655 B2 | 1/2007 | Sachdeva et al. |
| 7,184,036 B2 | 2/2007 | Dimsdale et al. |
| 7,209,557 B2 | 4/2007 | Lahiri |
| 7,212,656 B2 | 5/2007 | Liu et al. |
| 7,212,664 B2 | 5/2007 | Lee et al. |
| 7,215,430 B2 | 5/2007 | Kacyra et al. |
| 7,218,150 B2 | 5/2007 | Kitagawa et al. |
| 7,218,323 B1 | 5/2007 | Halmshaw et al. |
| 7,219,995 B2 | 5/2007 | Ollendorf et al. |
| 7,224,357 B2 | 5/2007 | Chen et al. |
| 7,234,937 B2 | 6/2007 | Sachdeva et al. |
| 7,242,807 B2 | 7/2007 | Waupotitsch et al. |
| 7,290,201 B1 | 10/2007 | Edwards |
| 7,310,102 B2 | 12/2007 | Spicer |
| 7,324,110 B2 | 1/2008 | Edwards et al. |
| 7,415,152 B2 | 8/2008 | Jiang et al. |
| 7,421,097 B2 | 9/2008 | Hamza et al. |
| 7,426,292 B2 | 9/2008 | Moghaddam et al. |
| 7,434,931 B2 | 10/2008 | Warden et al. |
| 7,436,988 B2 | 10/2008 | Zhang et al. |
| 7,441,895 B2 | 10/2008 | Akiyama et al. |
| 7,450,737 B2 | 11/2008 | Ishikawa et al. |
| 7,489,768 B1 | 2/2009 | Strietzel |
| 7,492,364 B2 | 2/2009 | Devarajan et al. |
| 7,508,977 B2 | 3/2009 | Lyons et al. |
| 7,523,411 B2 | 4/2009 | Carlin |
| 7,530,690 B2 | 5/2009 | Divo et al. |
| 7,532,215 B2 | 5/2009 | Yoda et al. |
| 7,533,453 B2 | 5/2009 | Yancy |
| 7,540,611 B2 | 6/2009 | Welk et al. |
| 7,557,812 B2 | 7/2009 | Chou et al. |
| 7,563,975 B2 | 7/2009 | Leahy et al. |
| 7,573,475 B2 | 8/2009 | Sullivan et al. |
| 7,573,489 B2 | 8/2009 | Davidson et al. |
| 7,587,082 B1 | 9/2009 | Rudin et al. |
| 7,609,859 B2 | 10/2009 | Lee et al. |
| 7,630,580 B1 | 12/2009 | Repenning |
| 7,634,103 B2 | 12/2009 | Rubinstenn et al. |
| 7,643,685 B2 | 1/2010 | Miller |
| 7,646,909 B2 | 1/2010 | Jiang et al. |
| 7,651,221 B2 | 1/2010 | Krengel et al. |
| 7,656,402 B2 | 2/2010 | Abraham et al. |
| 7,657,083 B2 | 2/2010 | Parr et al. |
| 7,663,648 B1 | 2/2010 | Saldanha et al. |
| 7,665,843 B2 | 2/2010 | Xie |
| 7,689,043 B2 | 3/2010 | Austin et al. |
| 7,699,300 B2 | 4/2010 | Iguchi |
| 7,711,155 B1 | 5/2010 | Sharma et al. |
| 7,717,708 B2 | 5/2010 | Sachdeva et al. |
| 7,720,285 B2 | 5/2010 | Ishikawa et al. |
| D616,918 S | 6/2010 | Rohrbach |
| 7,736,147 B2 | 6/2010 | Kaza et al. |
| 7,755,619 B2 | 7/2010 | Wang et al. |
| 7,756,325 B2 | 7/2010 | Vetter et al. |
| 7,760,923 B2 | 7/2010 | Walker et al. |
| 7,768,528 B1 | 8/2010 | Edwards et al. |
| D623,216 S | 9/2010 | Rohrbach |
| 7,804,997 B2 | 9/2010 | Geng et al. |
| 7,814,436 B2 | 10/2010 | Schrag et al. |
| 7,830,384 B1 | 11/2010 | Edwards et al. |
| 7,835,565 B2 | 11/2010 | Cai et al. |
| 7,835,568 B2 | 11/2010 | Park et al. |
| 7,845,797 B2 | 12/2010 | Warden et al. |
| 7,848,548 B1 | 12/2010 | Moon et al. |
| 7,852,995 B2 | 12/2010 | Strietzel |
| 7,856,125 B2 | 12/2010 | Medioni et al. |
| 7,860,225 B2 | 12/2010 | Strietzel |
| 7,860,301 B2 | 12/2010 | Se et al. |
| 7,876,931 B2 | 1/2011 | Geng |
| 7,896,493 B2 | 3/2011 | Welk et al. |
| 7,907,774 B2 | 3/2011 | Parr et al. |
| 7,929,745 B2 | 4/2011 | Walker et al. |
| 7,929,775 B2 | 4/2011 | Hager et al. |
| 7,953,675 B2 | 5/2011 | Medioni et al. |
| 7,961,914 B1 | 6/2011 | Smith |
| 8,009,880 B2 | 8/2011 | Zhang et al. |
| 8,026,916 B2 | 9/2011 | Wen |
| 8,026,917 B1 | 9/2011 | Rogers et al. |
| 8,026,929 B2 | 9/2011 | Naimark |
| 8,031,909 B2 | 10/2011 | Se et al. |
| 8,031,933 B2 | 10/2011 | Se et al. |
| 8,059,917 B2 | 11/2011 | Dumas et al. |
| 8,064,685 B2 | 11/2011 | Solem et al. |
| 8,070,619 B2 | 12/2011 | Edwards |
| 8,073,196 B2 | 12/2011 | Yuan et al. |
| 8,090,160 B2 | 1/2012 | Kakadiaris et al. |
| 8,113,829 B2 | 2/2012 | Sachdeva et al. |
| 8,118,427 B2 | 2/2012 | Bonnin et al. |
| 8,126,242 B2 | 2/2012 | Brett et al. |
| 8,126,249 B2 | 2/2012 | Brett et al. |
| 8,126,261 B2 | 2/2012 | Medioni et al. |
| 8,130,225 B2 | 3/2012 | Sullivan et al. |
| 8,131,063 B2 | 3/2012 | Xiao et al. |
| 8,132,123 B2 | 3/2012 | Schrag et al. |
| 8,144,153 B1 | 3/2012 | Sullivan et al. |
| 8,145,545 B2 | 3/2012 | Rathod et al. |
| 8,155,411 B2 | 4/2012 | Hof et al. |
| 8,160,345 B2 | 4/2012 | Pavlovskaia et al. |
| 8,177,551 B2 | 5/2012 | Sachdeva et al. |
| 8,182,087 B2 | 5/2012 | Esser et al. |
| 8,194,072 B2 | 6/2012 | Jones et al. |
| 8,199,152 B2 | 6/2012 | Sullivan et al. |
| 8,200,502 B2 | 6/2012 | Wedwick |
| 8,204,299 B2 | 6/2012 | Arcas et al. |
| 8,204,301 B2 | 6/2012 | Xiao et al. |
| 8,204,334 B2 | 6/2012 | Bhagavathy et al. |
| 8,208,717 B2 | 6/2012 | Xiao et al. |
| 8,212,812 B2 | 7/2012 | Tsin et al. |
| 8,217,941 B2 | 7/2012 | Park et al. |
| 8,218,836 B2 | 7/2012 | Metaxas et al. |
| 8,224,039 B2 | 7/2012 | Ionita et al. |
| 8,243,065 B2 | 8/2012 | Kim |
| 8,248,417 B1 | 8/2012 | Clifton |
| 8,260,006 B1 | 9/2012 | Callari et al. |
| 8,260,038 B2 | 9/2012 | Xiao et al. |
| 8,260,039 B2 | 9/2012 | Shiell et al. |
| 8,264,504 B2 | 9/2012 | Naimark |
| 8,269,779 B2 | 9/2012 | Rogers et al. |
| 8,274,506 B1 | 9/2012 | Rees |
| 8,284,190 B2 | 10/2012 | Muktinutalapati et al. |
| 8,286,083 B2 | 10/2012 | Barrus et al. |
| 8,289,317 B2 | 10/2012 | Harvill |
| 8,290,769 B2 | 10/2012 | Taub et al. |
| 8,295,589 B2 | 10/2012 | Ofek et al. |
| 8,300,900 B2 | 10/2012 | Lai et al. |
| 8,303,113 B2 | 11/2012 | Esser et al. |
| 8,307,560 B2 | 11/2012 | Tulin |
| 8,330,801 B2 | 12/2012 | Wang et al. |
| 8,346,020 B2 | 1/2013 | Guntur |

(56) References Cited

U.S. PATENT DOCUMENTS

| | | |
|---|---|---|
| 8,355,079 B2 | 1/2013 | Zhang et al. |
| 8,372,319 B2 | 2/2013 | Liguori et al. |
| 8,374,422 B2 | 2/2013 | Roussel |
| 8,385,646 B2 | 2/2013 | Lang et al. |
| 8,391,547 B2 | 3/2013 | Huang et al. |
| 8,459,792 B2 | 6/2013 | Wilson |
| 8,605,942 B2 | 12/2013 | Takeuchi |
| 8,605,989 B2 | 12/2013 | Rudin et al. |
| 8,743,051 B1 | 6/2014 | Moy et al. |
| 8,813,378 B2 | 8/2014 | Grove |
| 2001/0023413 A1 | 9/2001 | Fukuma et al. |
| 2001/0026272 A1 | 10/2001 | Feld et al. |
| 2001/0051517 A1 | 12/2001 | Strietzel |
| 2002/0010655 A1 | 1/2002 | Kjallstrom |
| 2002/0105530 A1 | 8/2002 | Waupotitsch et al. |
| 2002/0149585 A1 | 10/2002 | Kacyra et al. |
| 2003/0001835 A1 | 1/2003 | Dimsdale et al. |
| 2003/0030904 A1 | 2/2003 | Huang |
| 2003/0071810 A1 | 4/2003 | Shoov et al. |
| 2003/0110099 A1 | 6/2003 | Trajkovic et al. |
| 2003/0112240 A1* | 6/2003 | Cerny ............ 345/428 |
| 2004/0004633 A1 | 1/2004 | Perry et al. |
| 2004/0090438 A1* | 5/2004 | Alliez et al. ............ 345/423 |
| 2004/0217956 A1 | 11/2004 | Besl et al. |
| 2004/0223631 A1 | 11/2004 | Waupotitsch et al. |
| 2004/0257364 A1 | 12/2004 | Basler |
| 2005/0053275 A1 | 3/2005 | Stokes |
| 2005/0063582 A1 | 3/2005 | Park et al. |
| 2005/0111705 A1 | 5/2005 | Waupotitsch et al. |
| 2005/0128211 A1* | 6/2005 | Berger et al. ............ 345/582 |
| 2005/0162419 A1* | 7/2005 | Kim et al. ............ 345/419 |
| 2005/0190264 A1 | 9/2005 | Neal |
| 2005/0208457 A1 | 9/2005 | Fink et al. |
| 2005/0226509 A1 | 10/2005 | Maurer et al. |
| 2006/0012748 A1 | 1/2006 | Periasamy et al. |
| 2006/0017887 A1 | 1/2006 | Jacobson et al. |
| 2006/0067573 A1 | 3/2006 | Parr et al. |
| 2006/0127852 A1 | 6/2006 | Wen |
| 2006/0161474 A1 | 7/2006 | Diamond et al. |
| 2006/0212150 A1 | 9/2006 | Sims, Jr. |
| 2006/0216680 A1 | 9/2006 | Buckwalter et al. |
| 2007/0013873 A9 | 1/2007 | Jacobson et al. |
| 2007/0104360 A1 | 5/2007 | Huang et al. |
| 2007/0127848 A1 | 6/2007 | Kim et al. |
| 2007/0160306 A1 | 7/2007 | Ahn et al. |
| 2007/0183679 A1 | 8/2007 | Moroto et al. |
| 2007/0233311 A1 | 10/2007 | Okada et al. |
| 2007/0262988 A1* | 11/2007 | Christensen ............ 345/424 |
| 2008/0084414 A1* | 4/2008 | Rosel et al. ............ 345/423 |
| 2008/0112610 A1 | 5/2008 | Israelsen et al. |
| 2008/0136814 A1 | 6/2008 | Chu et al. |
| 2008/0152200 A1 | 6/2008 | Medioni et al. |
| 2008/0162695 A1 | 7/2008 | Muhn et al. |
| 2008/0163344 A1 | 7/2008 | Yang |
| 2008/0170077 A1 | 7/2008 | Sullivan et al. |
| 2008/0201641 A1 | 8/2008 | Xie |
| 2008/0219589 A1 | 9/2008 | Jung et al. |
| 2008/0240588 A1 | 10/2008 | Tsoupko-Sitnikov et al. |
| 2008/0246759 A1 | 10/2008 | Summers |
| 2008/0271078 A1 | 10/2008 | Gossweiler et al. |
| 2008/0278437 A1 | 11/2008 | Barrus et al. |
| 2008/0278633 A1 | 11/2008 | Tsoupko-Sitnikov et al. |
| 2008/0279478 A1 | 11/2008 | Tsoupko-Sitnikov et al. |
| 2008/0280247 A1 | 11/2008 | Sachdeva et al. |
| 2008/0294393 A1 | 11/2008 | Laake et al. |
| 2008/0297503 A1 | 12/2008 | Dickinson et al. |
| 2008/0310757 A1 | 12/2008 | Wolberg et al. |
| 2009/0010507 A1 | 1/2009 | Geng |
| 2009/0040216 A1 | 2/2009 | Ishiyama |
| 2009/0123037 A1 | 5/2009 | Ishida |
| 2009/0129402 A1 | 5/2009 | Moller et al. |
| 2009/0132371 A1 | 5/2009 | Strietzel et al. |
| 2009/0135176 A1 | 5/2009 | Snoddy et al. |
| 2009/0135177 A1 | 5/2009 | Strietzel et al. |
| 2009/0144173 A1 | 6/2009 | Mo et al. |
| 2009/0153552 A1 | 6/2009 | Fidaleo et al. |
| 2009/0153553 A1 | 6/2009 | Kim et al. |
| 2009/0153569 A1 | 6/2009 | Park et al. |
| 2009/0154794 A1 | 6/2009 | Kim et al. |
| 2009/0184960 A1 | 7/2009 | Carr et al. |
| 2009/0185763 A1 | 7/2009 | Park et al. |
| 2009/0219281 A1 | 9/2009 | Maillot |
| 2009/0279784 A1 | 11/2009 | Arcas et al. |
| 2009/0296984 A1 | 12/2009 | Nijim et al. |
| 2009/0304270 A1 | 12/2009 | Bhagavathy et al. |
| 2009/0310861 A1 | 12/2009 | Lang et al. |
| 2009/0316945 A1 | 12/2009 | Akansu |
| 2009/0316966 A1 | 12/2009 | Marshall et al. |
| 2009/0324030 A1 | 12/2009 | Frinking et al. |
| 2009/0324121 A1 | 12/2009 | Bhagavathy et al. |
| 2010/0030578 A1 | 2/2010 | Siddique et al. |
| 2010/0134487 A1 | 6/2010 | Lai et al. |
| 2010/0138025 A1 | 6/2010 | Morton et al. |
| 2010/0141893 A1 | 6/2010 | Altheimer et al. |
| 2010/0145489 A1 | 6/2010 | Esser et al. |
| 2010/0166978 A1 | 7/2010 | Nieminen |
| 2010/0179789 A1 | 7/2010 | Sachdeva et al. |
| 2010/0191504 A1 | 7/2010 | Esser et al. |
| 2010/0198817 A1 | 8/2010 | Esser et al. |
| 2010/0209005 A1 | 8/2010 | Rudin et al. |
| 2010/0277476 A1* | 11/2010 | Johansson et al. ............ 345/423 |
| 2010/0293192 A1 | 11/2010 | Suy et al. |
| 2010/0293251 A1 | 11/2010 | Suy et al. |
| 2010/0302275 A1 | 12/2010 | Saldanha et al. |
| 2010/0329568 A1 | 12/2010 | Gamliel et al. |
| 2011/0001791 A1 | 1/2011 | Kirshenboim et al. |
| 2011/0025827 A1 | 2/2011 | Shpunt et al. |
| 2011/0026606 A1 | 2/2011 | Bhagavathy et al. |
| 2011/0026607 A1 | 2/2011 | Bhagavathy et al. |
| 2011/0029561 A1 | 2/2011 | Slaney et al. |
| 2011/0040539 A1 | 2/2011 | Szymczyk et al. |
| 2011/0043540 A1 | 2/2011 | Fancher et al. |
| 2011/0043610 A1 | 2/2011 | Ren et al. |
| 2011/0071804 A1 | 3/2011 | Xie |
| 2011/0075916 A1 | 3/2011 | Knothe et al. |
| 2011/0096832 A1 | 4/2011 | Zhang et al. |
| 2011/0102553 A1 | 5/2011 | Corcoran et al. |
| 2011/0115786 A1 | 5/2011 | Mochizuki |
| 2011/0148858 A1 | 6/2011 | Ni et al. |
| 2011/0157229 A1 | 6/2011 | Ni et al. |
| 2011/0158394 A1 | 6/2011 | Strietzel |
| 2011/0166834 A1 | 7/2011 | Clara |
| 2011/0188780 A1 | 8/2011 | Wang et al. |
| 2011/0208493 A1 | 8/2011 | Altheimer et al. |
| 2011/0211816 A1 | 9/2011 | Goedeken et al. |
| 2011/0227923 A1 | 9/2011 | Mariani et al. |
| 2011/0227934 A1 | 9/2011 | Sharp |
| 2011/0229659 A1 | 9/2011 | Reynolds |
| 2011/0229660 A1 | 9/2011 | Reynolds |
| 2011/0234581 A1 | 9/2011 | Eikelis et al. |
| 2011/0234591 A1 | 9/2011 | Mishra et al. |
| 2011/0262717 A1 | 10/2011 | Broen et al. |
| 2011/0279634 A1 | 11/2011 | Periyannan et al. |
| 2011/0292034 A1 | 12/2011 | Corazza et al. |
| 2011/0293247 A1 | 12/2011 | Bhagavathy et al. |
| 2011/0304912 A1 | 12/2011 | Broen et al. |
| 2011/0306417 A1 | 12/2011 | Sheblak et al. |
| 2012/0002161 A1 | 1/2012 | Altheimer et al. |
| 2012/0008090 A1 | 1/2012 | Atheimer et al. |
| 2012/0013608 A1 | 1/2012 | Ahn et al. |
| 2012/0016645 A1 | 1/2012 | Altheimer et al. |
| 2012/0021835 A1 | 1/2012 | Keller et al. |
| 2012/0038665 A1 | 2/2012 | Strietzel |
| 2012/0075296 A1 | 3/2012 | Wegbreit et al. |
| 2012/0079377 A1 | 3/2012 | Goossens |
| 2012/0082432 A1 | 4/2012 | Ackley et al. |
| 2012/0114184 A1 | 5/2012 | Barcons-Palau et al. |
| 2012/0114251 A1 | 5/2012 | Solem et al. |
| 2012/0121174 A1 | 5/2012 | Bhagavathy et al. |
| 2012/0130524 A1 | 5/2012 | Clara et al. |
| 2012/0133640 A1 | 5/2012 | Chin et al. |
| 2012/0133850 A1 | 5/2012 | Broen et al. |
| 2012/0147324 A1 | 6/2012 | Marin et al. |
| 2012/0158369 A1 | 6/2012 | Bachrach et al. |

(56) References Cited

U.S. PATENT DOCUMENTS

| | | | |
|---|---|---|---|
| 2012/0162218 A1 | 6/2012 | Kim et al. |
| 2012/0166431 A1 | 6/2012 | Brewington et al. |
| 2012/0170821 A1 | 7/2012 | Zug et al. |
| 2012/0176380 A1 | 7/2012 | Wang et al. |
| 2012/0177283 A1 | 7/2012 | Wang et al. |
| 2012/0183202 A1 | 7/2012 | Wei et al. |
| 2012/0183204 A1 | 7/2012 | Aarts et al. |
| 2012/0183238 A1 | 7/2012 | Savvides et al. |
| 2012/0192401 A1 | 8/2012 | Pavlovskaia et al. |
| 2012/0206610 A1 | 8/2012 | Wang et al. |
| 2012/0219195 A1 | 8/2012 | Wu et al. |
| 2012/0224629 A1 | 9/2012 | Bhagavathy et al. |
| 2012/0229758 A1 | 9/2012 | Marin et al. |
| 2012/0256906 A1 | 10/2012 | Ross et al. |
| 2012/0263437 A1 | 10/2012 | Barcons-Palau et al. |
| 2012/0288015 A1 | 11/2012 | Zhang et al. |
| 2012/0294369 A1 | 11/2012 | Bhagavathy et al. |
| 2012/0294530 A1 | 11/2012 | Bhaskaranand et al. |
| 2012/0299914 A1 | 11/2012 | Kilpatrick et al. |
| 2012/0306874 A1 | 12/2012 | Nguyen et al. |
| 2012/0307074 A1 | 12/2012 | Bhagavathy et al. |
| 2012/0314023 A1 | 12/2012 | Barcons-Palau et al. |
| 2012/0320153 A1 | 12/2012 | Barcons-Palau et al. |
| 2012/0321128 A1 | 12/2012 | Medioni et al. |
| 2012/0323581 A1 | 12/2012 | Strietzel et al. |
| 2013/0027657 A1 | 1/2013 | Esser et al. |
| 2013/0070973 A1 | 3/2013 | Saito et al. |
| 2013/0088490 A1* | 4/2013 | Rasmussen et al. .......... 345/421 |
| 2013/0187915 A1 | 7/2013 | Lee et al. |
| 2013/0201187 A1 | 8/2013 | Tong et al. |
| 2013/0271451 A1 | 10/2013 | Tong et al. |

FOREIGN PATENT DOCUMENTS

| | | |
|---|---|---|
| EP | 0359596 A1 | 3/1990 |
| EP | 0994336 A2 | 4/2000 |
| EP | 1011006 A1 | 6/2000 |
| EP | 1136869 A1 | 9/2001 |
| EP | 1138253 A2 | 10/2001 |
| EP | 0444902 B2 | 6/2002 |
| EP | 1450201 A1 | 8/2004 |
| EP | 1728467 A1 | 12/2006 |
| EP | 1154302 B1 | 8/2009 |
| FR | 2966038 A1 | 4/2012 |
| GB | 2449855 A | 12/2008 |
| JP | 2003345857 A | 12/2003 |
| JP | 2004272530 A | 9/2004 |
| JP | 2005269022 A | 9/2005 |
| KR | 20000028583 A | 5/2000 |
| KR | 200000051217 A | 8/2000 |
| KR | 20040097200 A | 11/2004 |
| KR | 20080086945 A | 9/2008 |
| KR | 20100050052 A | 5/2010 |
| WO | WO 9300641 A1 | 1/1993 |
| WO | WO 9604596 A1 | 2/1996 |
| WO | WO 9740342 A2 | 10/1997 |
| WO | WO 9740960 A1 | 11/1997 |
| WO | WO 9813721 A1 | 4/1998 |
| WO | WO 9827861 A1 | 7/1998 |
| WO | WO 9827902 A2 | 7/1998 |
| WO | WO 9835263 A1 | 8/1998 |
| WO | WO 9852189 A2 | 11/1998 |
| WO | WO 9857270 A1 | 12/1998 |
| WO | WO 9956942 A1 | 11/1999 |
| WO | WO 9964918 A1 | 12/1999 |
| WO | WO 0000863 A1 | 1/2000 |
| WO | WO 0016683 A1 | 3/2000 |
| WO | WO 0045348 A1 | 8/2000 |
| WO | WO 0049919 A1 | 8/2000 |
| WO | WO 0062148 A1 | 10/2000 |
| WO | WO 0064168 A1 | 10/2000 |
| WO | WO 0123908 A1 | 4/2001 |
| WO | WO 0132074 A1 | 5/2001 |
| WO | WO 0135338 A1 | 5/2001 |
| WO | WO 0161447 A1 | 8/2001 |
| WO | WO 0167325 A1 | 9/2001 |
| WO | WO 0174553 A2 | 10/2001 |
| WO | WO 0178630 A1 | 10/2001 |
| WO | WO 0188654 A2 | 11/2001 |
| WO | WO 0207845 A1 | 1/2002 |
| WO | WO 0241127 A2 | 5/2002 |
| WO | WO 03079097 A1 | 9/2003 |
| WO | WO 03084448 A1 | 10/2003 |
| WO | WO 2007012261 A1 | 2/2007 |
| WO | WO 2007017751 A1 | 2/2007 |
| WO | WO 2007018017 A1 | 2/2007 |
| WO | WO 2008009355 A1 | 1/2008 |
| WO | WO 2008009423 A1 | 1/2008 |
| WO | WO 2008135178 A1 | 11/2008 |
| WO | WO 2009023012 A1 | 2/2009 |
| WO | WO 2009043941 A1 | 4/2009 |
| WO | 2010039976 A1 | 4/2010 |
| WO | 2010042990 A1 | 4/2010 |
| WO | WO 2011012743 A2 | 2/2011 |
| WO | WO 2011095917 A1 | 8/2011 |
| WO | WO 2011134611 A1 | 11/2011 |
| WO | WO 2011147649 A1 | 12/2011 |
| WO | WO 2012051654 A1 | 4/2012 |
| WO | WO 2012054972 A1 | 5/2012 |
| WO | WO 2012054983 A1 | 5/2012 |

OTHER PUBLICATIONS

PCT International Search Report for PCT International Patent Application No. PCT/US2013/042512, mailed Sep. 6, 2013.
PCT International Search Report for PCT International Patent Application No. PCT/US2013/042529, mailed Sep. 17, 2013.
PCT International Search Report for PCT International Patent Application No. PCT/US2013/042525, mailed Sep. 17, 2013.
PCT International Search Report for PCT International Patent Application No. PCT/US2013/042520, mailed Sep. 27, 2013.
PCT International Search Report for PCT International Patent Application No. PCT/US2012/068174, mailed Mar. 7, 2013.
PCT International Search Report for PCT International Patent Application No. PCT/US2013/042504, mailed Aug. 19, 2013.
PCT International Search Report for PCT International Patent Application No. PCT/US2013/042509, mailed Sep. 2, 2013.
PCT International Search Report for PCT International Patent Application No. PCT/US2013/042514, mailed Aug. 30, 2013.
PCT International Search Report for PCT International Patent Application No. PCT/US2013/042517, mailed Aug. 29, 2013.
3D Morphable Model Face Animation, http://www.youtube.com/watch?v=nice6NYb_WA, Apr. 20, 2006.
Visionix 3D iView, Human Body Measurement Newsletter, vol. 1., No. 2, Sep. 2005, pp. 2 and 3.
Blaise Aguera y Areas demos Photosynth, May 2007. Ted.com, http://www.ted.com/talks/blaise_aguera_y_arcas_demos_photosynth.html.
ERC Tecnology Leads to Eyeglass "Virtual Try-on" System, Apr. 20, 2012, http://showcase.erc-assoc.org/accomplishments/microelectronic/imsc6-eyeglass.htm.
Information about Related Patents and Patent Applications, see the section below having the same title.
U.S. Appl. No. 13/775,785, filed Feb. 25, 2013, Systems and Methods for Adjusting a Virtual Try-On.
U.S. Appl. No. 13/775,764, filed Feb. 25, 2013, Systems and Methods for Feature Tracking.
U.S. Appl. No. 13/774,995, filed Feb. 22, 2013, Systems and Methods for Scaling a Three-Dimensional Model.
U.S. Appl. No. 13/774,985, filed Feb. 22, 2013, Systems and Methods for Generating a 3-D Model of a Virtual Try-On Product.
U.S. Appl. No. 13/774,983, filed Feb. 22, 2013, Systems and Methods for Generating a 3-D Model of a User for a Virtual Try-On Product.
U.S. Appl. No. 13/774,978, filed Feb. 22, 2013, System and Methods for Efficiently Processing Virtual 3-D Data.
U.S. Appl. No. 13/774,958, filed Feb. 22, 2013, Systems and Methods for Rendering Virtual Try-On Products.

(56) References Cited

OTHER PUBLICATIONS

U.S. Appl. No. 13/706,909, filed Dec. 6, 2012, Systems and Methods for Obtaining a Pupillary Distance Measurement Using a Mobile Computing Device.

Tracker, Tracker Help, Nov. 2009.

Sinha et al., GPU-based Video Feautre Tracking and Matching, http:::frahm.web.unc.edu/files/2014/01/GPU-based-Video-Feature-Tracking-And Matching.pdf, May 2006.

Simonite, 3-D Models Created by a Cell Phone, Mar. 23, 2011, url: http://www.technologyreview.com/news/423386/3-d-models-created-by-a-cell-phone/.

Fidaleo, Model-Assisted 3D Face Reconstruction from Video, AMFG'07 Analysis and Modeling of Faces and Gestures Lecture Notes in Computer Science vol. 4778, 2007, pp. 124-138.

Garcia-Mateos, Estimating 3D facial pose in video with just three points, CVPRW '08 Computer vision and Pattern Recognition Workshops, 2008.

\* cited by examiner

SYSTEMS AND METHODS FOR GENERATING A 3-D MODEL OF A VIRTUAL TRY-ON PRODUCT

RELATED APPLICATIONS

This application claims priority to U.S. Provisional Application No. 61/650,983, entitled SYSTEMS AND METHODS TO VIRTUALLY TRY-ON PRODUCTS, filed on May 23, 2012; and U.S. Provisional Application No. 61/735,951, entitled SYSTEMS AND METHODS TO VIRTUALLY TRY-ON PRODUCTS, filed on Dec. 11, 2012, which is incorporated herein in its entirety by this reference.

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computers have opened up an entire industry of internet shopping. In many ways, online shopping has changed the way consumers purchase products. For example, a consumer may want to know what they will look like in and/or with a product. On the webpage of a certain product, a photograph of a model with the particular product may be shown. However, users may want to see more accurate depictions of themselves in relation to various products.

SUMMARY

According to at least one embodiment, a computer-implemented method for generating a virtual try-on product is described. At least a portion of an object may be scanned. The object may include at least first and second surfaces. An aspect of the first surface may be detected. An aspect of the second surface may be detected. The aspect of the first surface may be different from the aspect of the second surface. A polygon mesh of the first and second surfaces may be generated from the scan of the object In one embodiment, the polygon mesh may be positioned in relation to a 3-D fitting object in a virtual 3-D space. The shape and size of the 3-D fitting object may be predetermined. At least one point of intersection may be determined between the polygon mesh and the 3-D fitting object.

In some configurations, the object may be scanned at a plurality of predetermined viewing angles. The polygon mesh may be rendered at the predetermined viewing angles. One or more vertices of the polygon mesh corresponding to the first surface may be modified to simulate the first surface. Modifying the one or more vertices of the polygon mesh of the first surface may include adding a plurality of vertices to at least a portion of the polygon mesh corresponding to the first surface. A decimation algorithm may be performed on at least a portion of the polygon mesh corresponding to the second surface.

In some embodiments, at least one symmetrical aspect of the object may be determined. Upon determining the symmetrical aspect of the object, a portion of the object may be scanned based on the determined symmetrical aspect. The result of scanning the object may be mirrored in order to generate a portion of the polygon mesh that corresponds to a portion of the object not scanned. A texture map may be generated from the scan of the object. The texture map may include a plurality of images depicting the first and second surfaces of the object. The texture map may map a two-dimensional (2-D) coordinate of one of the plurality of images depicting the first and second surfaces of the object to a 3-D coordinate of the generated polygon mesh of the object.

A computing device configured to generate a virtual try-on product is also described. The device may include a processor and memory in electronic communication with the processor. The memory may store instructions that are executable by the processor to scan at least a portion of an object, wherein the object includes at least first and second surfaces, detect an aspect of the first surface, and detect an aspect of the second surface. The second aspect may be different from the first aspect. The instructions may be executable by the processor to generate a polygon mesh of the first and second surfaces from the scan of the object.

A computer-program product to generate a virtual try-on product is also described. The computer-program product may include a non-transitory computer-readable medium that stores instructions. The instructions may be executable by a processor to scan at least a portion of an object, wherein the object includes at least first and second surfaces, detect an aspect of the first surface, and detect an aspect of the second surface. The second aspect may be different from the first aspect. The instructions may be executable by the processor to generate a polygon mesh of the first and second surfaces from the scan of the object.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
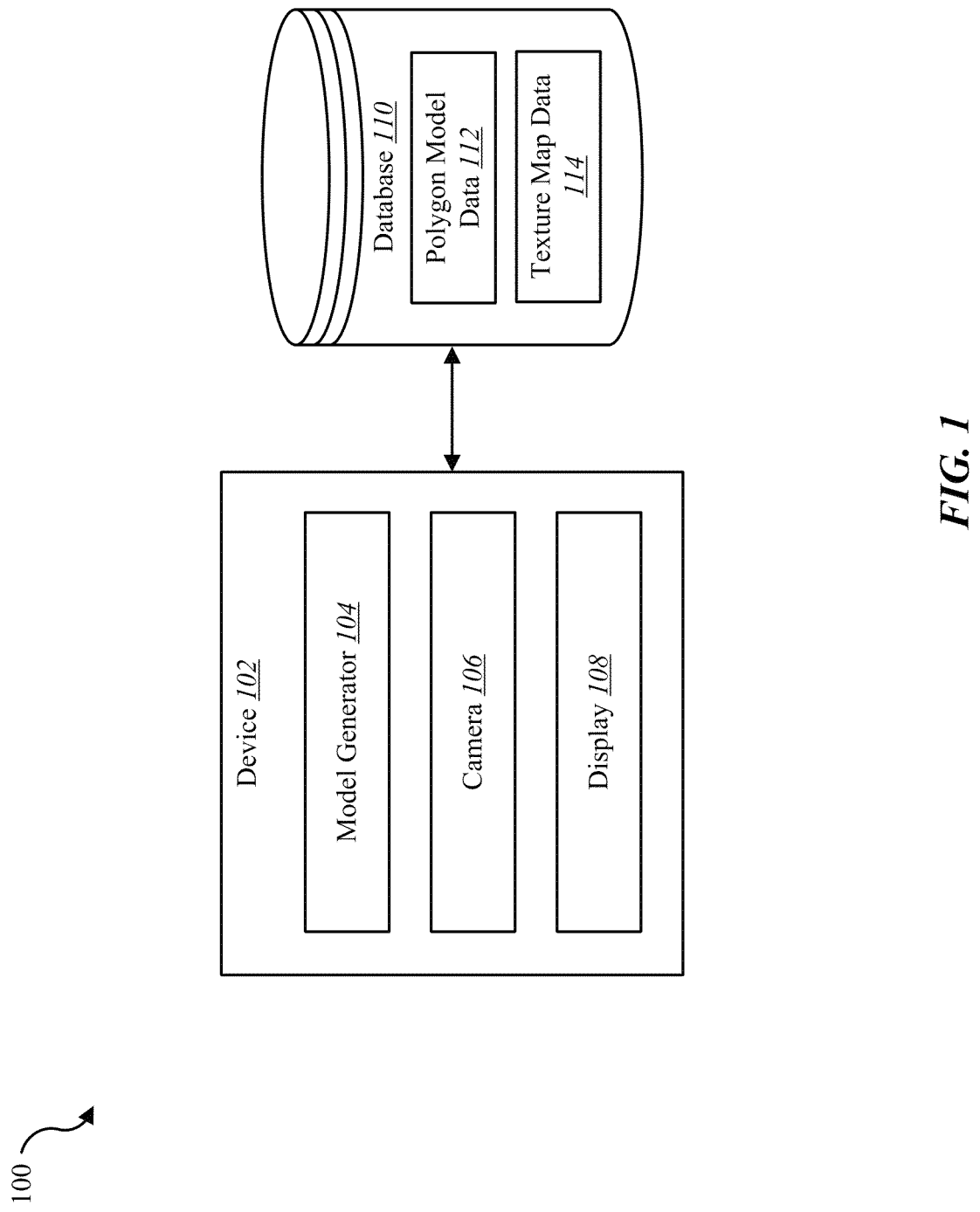
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to the virtually trying-on of products. Three-dimensional (3-D) computer graphics are graphics that use a 3-D representation of geometric data that is stored in the computer for the purposes of performing calculations and rendering two-dimensional (2-D) images. Such images may be stored for viewing later or displayed in real-time. A 3-D space may include a mathematical representation of a 3-D surface of an object. A 3-D model may be contained within a graphical data file. A 3-D model may represent a 3-D object using a collection of points in 3-D space, connected by various geometric entities such as triangles, lines, curved surfaces, etc. Being a collection of data (points and other information), 3-D models may be created by hand, algorithmically (procedural modeling), or scanned such as with a laser scanner. A 3-D model may be displayed visually as a two-dimensional image through rendering, or used in non-graphical computer simulations and calculations. In some cases, the 3-D model may be physically created using a 3-D printing device.

A device may capture an image of the user and generate a 3-D model of the user from the image. A 3-D polygon mesh of an object may be placed in relation to the 3-D model of the user to create a 3-D virtual depiction of the user wearing the object (e.g., a pair of glasses, a hat, a shirt, a belt, etc.). This 3-D scene may then be rendered into a 2-D image to provide the user a virtual depiction of the user in relation to the object. Although some of the examples used herein describe articles of clothing, specifically a virtual try-on pair of glasses, it is understood that the systems and methods described herein may be used to virtually try-on a wide variety of products. Examples of such products may include glasses, clothing, footwear, jewelry, accessories, hair styles, etc.

FIG. 1 is a block diagram illustrating one embodiment of an environment 100 in which the present systems and methods may be implemented. In some embodiments, the systems and methods described herein may be performed on a single device (e.g., device 102). For example, a model generator 104 may be located on the device 102. Examples of devices 102 include mobile devices, smart phones, personal computing devices, computers, servers, etc.

In some configurations, a device 102 may include a model generator 104, a camera 106, and a display 108. In one example, the device 102 may be coupled to a database 110. In one embodiment, the database 110 may be internal to the device 102. In another embodiment, the database 110 may be external to the device 102. In some configurations, the database 110 may include polygon model data 112 and texture map data 114.

In one embodiment, the model generator 104 may initiate a process to generate a 3-D model of an object. As described above, the object may be a pair of glasses, an article of clothing, footwear, jewelry, an accessory, or a hair style. In some configurations, the model generator 104 may obtain multiple images of the object. For example, the model generator 104 may capture multiple images of an object via the camera 106. For instance, the model generator 104 may capture a video (e.g., a 5 second video) via the camera 106. In some configurations, the model generator 104 may use polygon model data 112 and texture map data 114 to generate a 3-D representation of the scanned object. For example, the polygon model data 112 may include vertex coordinates of a polygon model of a pair of glasses. In some embodiments, the model generator 104 may use color information from the pixels of multiple images of the object to create a texture map of the object. In some embodiments, the polygon model data 112 may include a polygon model of an object. In some configurations, the texture map data 114 may define a visual aspect of the 3-D model of the object such as color, texture, shadow, and/or transparency.

In some configurations, the model generator 104 may generate a virtual try-on image by rendering a virtual 3-D space that contains a 3-D model of a user in relation to the 3-D model of the object. In one example, the virtual try-on image may illustrate the user with a rendered version of the product. In some configurations, the model generator 104 may output the virtual try-on image to the display 108 to be displayed to a user.

Figure 2:
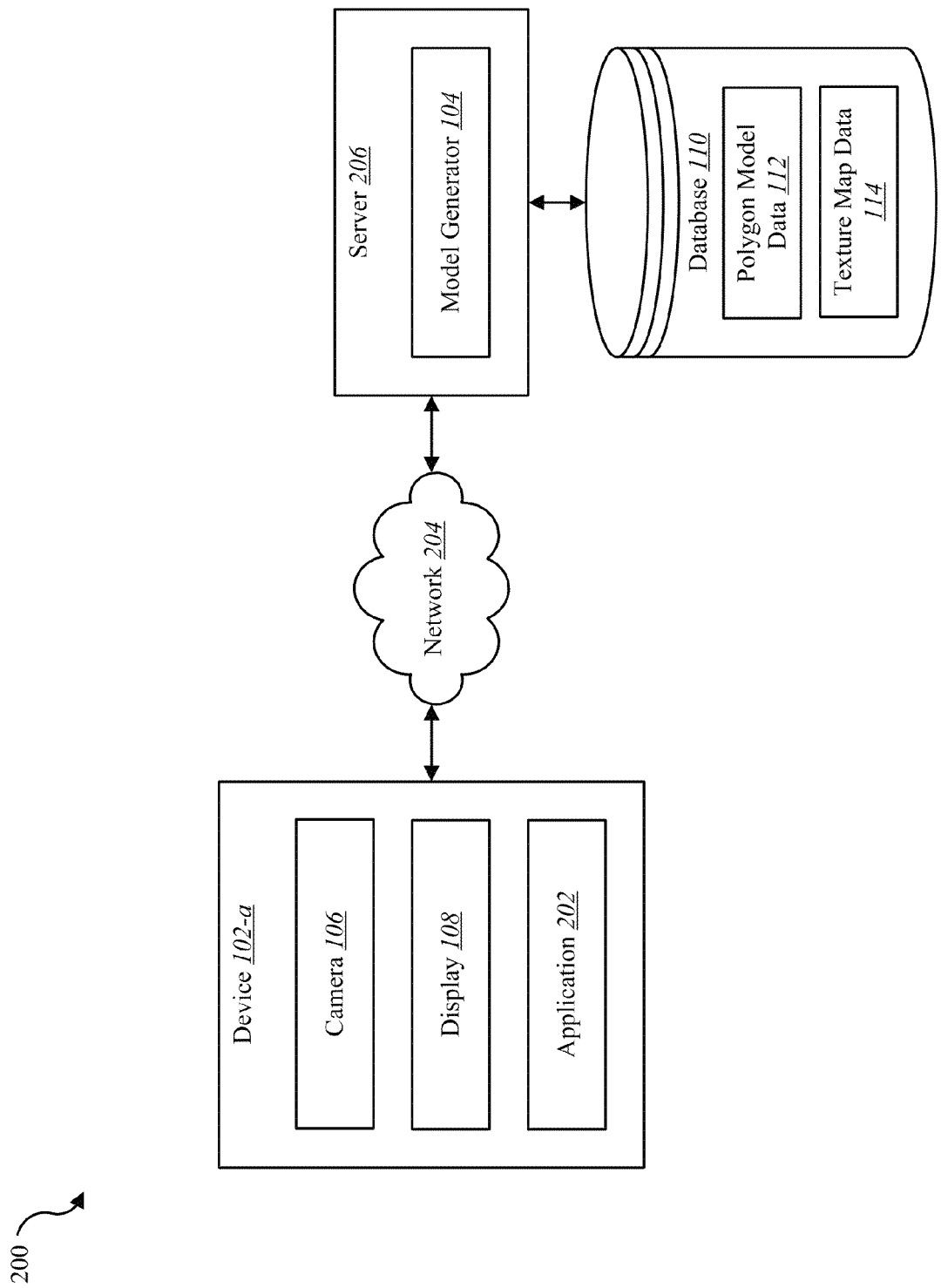
FIG. 2 is a block diagram illustrating another embodiment of an environment in which the present systems and methods may be implemented.

FIG. 2 is a block diagram illustrating another embodiment of an environment 200 in which the present systems and methods may be implemented. In some embodiments, a device 102-a may communicate with a server 206 via a network 204. Example of networks 204 include, local area networks (LAN), wide area networks (WAN), virtual private networks (VPN), wireless local area networks (WLAN), cellular networks (using 3G and/or LTE, for example), etc. In some configurations, the network 204 may include the internet. In some configurations, the device 102-a may be one example of the device 102 illustrated in FIG. 1. For example, the device 102-a may include the camera 106, the display 108, and an application 202. It is noted that in some embodiments, the device 102-a may not include a model generator 104. In some embodiments, both a device 102-a and a server 206 may include a model generator 104 where at least a portion of the functions of the model generator 104 are performed separately and/or concurrently on both the device 102-a and the server 206.

In some embodiments, the server 206 may include the model generator 104 and may be coupled to the database 110. For example, the model generator 104 may access the polygon model data 112 and the texture map data 114 in the database 110 via the server 206. The database 110 may be internal or external to the server 206.

In some configurations, the application 202 may capture multiple images via the camera 106. For example, the application 202 may use the camera 106 to capture a video. Upon capturing the multiple images, the application 202 may process the multiple images to generate result data. In some embodiments, the application 202 may transmit the multiple images to the server 206. Additionally or alternatively, the application 202 may transmit to the server 206 the result data or at least one file associated with the result data.

In some configurations, the model generator 104 may process multiple images of an object to generate a 3-D model of the object. The model generator 104 may render a 3-D space that includes the 3-D model of a user and the 3-D polygon model of the object to render a virtual try-on 2-D image of the object and the user. The application 202 may output a display of the user to the display 108 while the camera 106 captures an image of the user.

Figure 3:
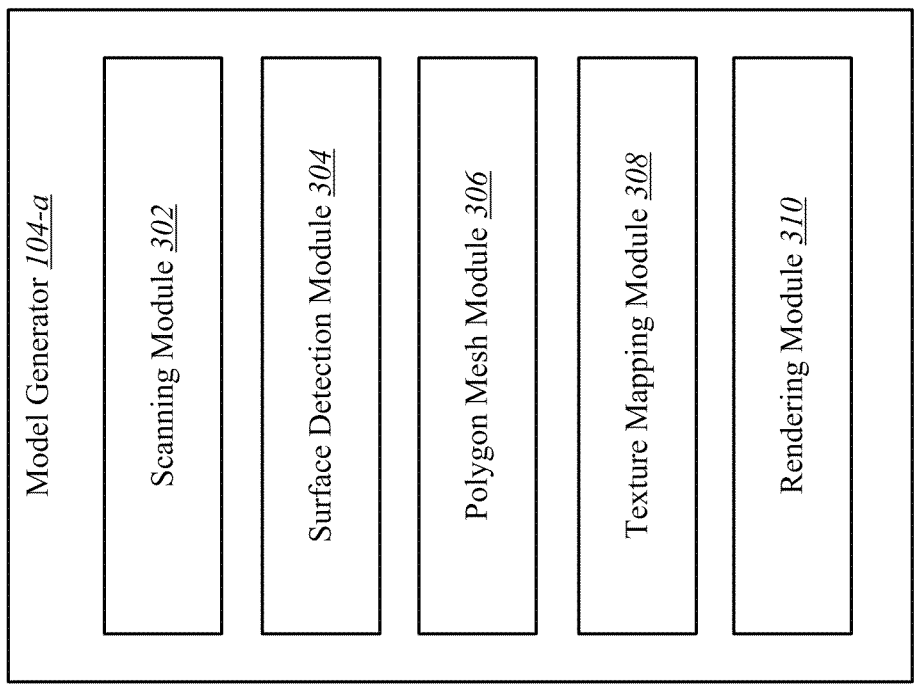
FIG. 3 is a block diagram illustrating one example of a model generator.

FIG. 3 is a block diagram illustrating one example of a model generator 104-a. The model generator 104-a may be one example of the model generator 104 depicted in FIGS. 1 and/or 2. As depicted, the model generator 104-a may include a scanning module 302, a surface detection module 304, a polygon mesh module 306, a texture mapping module 308, and a rendering module 310.

In some configurations, the scanning module 302 may obtain a plurality of images of an object. In some embodiments, the scanning module 302 may activate the camera 106 to capture at least one image of the object. Additionally, or alternatively, the scanning module 302 may capture a video of the object. In one embodiment, the scanning module 302 may include a laser to scan the object. In some configurations, the scanning module 302 may use structured light to scan the object. The scanning module 302 may scan at least a portion of the object. The object may include two or more distinguishable surfaces. In some embodiments, the scanning module 302 may scan the object at a plurality of predetermined viewing angles.

In one embodiment, the surface detection module 304 may detect one or more surfaces on the object being scanned. One or more surfaces on the object may have certain characteristics. For example, the object may have a surface that is glossy or shiny, a surface that is transparent, and/or a surface that is matte. For instance, from a scan of a pair of glasses the surface detection module 304 may detect a surface on the glasses corresponding to a lens, and detect a surface on the glasses corresponding to a portion of the frame. Thus, the surface detection module 304 may detect characteristics, or aspects, of two or more surfaces on the object where each characteristic is different from one or more characteristics of other surfaces.

In some configurations, from the scan of the object, the polygon mesh module 306 may generate a polygon mesh of each detected surface of the object. The texture mapping module 308 may be configured to generate a texture map from the scan of the object. The texture map may include a plurality of images depicting the first and second surfaces of the object. The texture map may correlate a two-dimensional (2-D) coordinate of one of the plurality of images depicting the first and second surfaces of the object to a 3-D coordinate of the generated polygon mesh of the object. Thus, in some configurations, the texture mapping module 308 may generate texture coordinate information associated with the determined 3-D structure of the object, where the texture coordinate information may relate a 2-D coordinate (e.g., UV coordinates) of an image of the object to a 3-D coordinate (e.g., XYZ coordinates) of the 3-D model of the object. In one configuration, the rendering module 310 may apply the texture map to the polygon mesh and render the polygon mesh at the predetermined viewing angles in relation to a plurality of images of a user.

Figure 4:
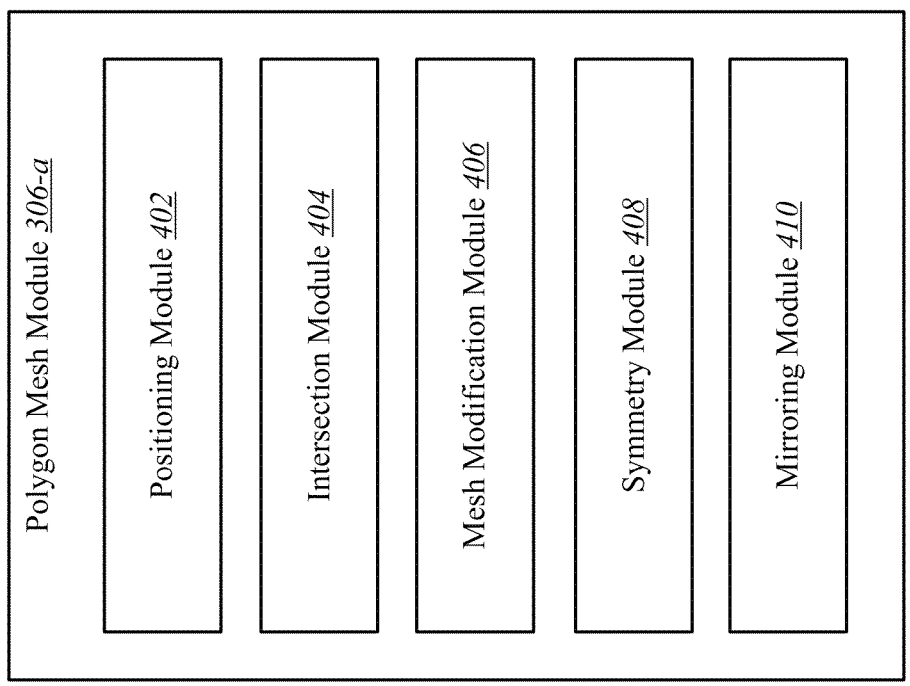
FIG. 4 is a block diagram illustrating one example of a polygon mesh module.

FIG. 4 is a block diagram illustrating one example of an polygon mesh module 306-a. The polygon mesh module 306-a may be one example of the image processor 304 illustrated in FIG. 3. As depicted, the polygon mesh module 306-a may include a positioning module 402, an intersection module 404, a mesh modification module 406, a symmetry module 408, and a mirroring module 410.

In one configuration, the positioning module 402 may position the polygon mesh in relation to a 3-D fitting object in a virtual 3-D space. The 3-D fitting object may include a predetermined shape and size. An example of the 3-D fitting object may include a universal 3-D model of a human head. For instance, a polygon mesh of a pair of glasses may be positioned in relation to a universal 3-D model of a human head in order to determine how to position the glasses on a realistic, scaled 3-D model of a user's head. In one embodiment, the intersection module 404 may determine at least one point of intersection between the polygon mesh and the 3-D fitting object.

In some configurations, the mesh modification module 406 may modify one or more vertices of the polygon mesh corresponding to one or more surfaces of the object in order to simulate a characteristic detected in a surface. For example, the surface corresponding to the lenses on a scanned pair of glasses may have a characteristic of being reflective, shiny, and/or transparent. The mesh modification module 406 may modify one or more 3-D points of data corresponding to the lenses in the polygon mesh of the glasses in order to better simulate the detected characteristics of reflectivity, shininess, and/or transparency detected from the scan of the glasses. In some configurations, the mesh modification module 406 may add one or more vertices to at least a portion of the polygon mesh corresponding to one of the surfaces of the scanned object. For example, the mesh modification module 406 may add one or more edge-loops to a region of the polygon mesh corresponding to a surface of the object in order to improve the visual simulation of that surface. In some configurations, the mesh modification module 406 may perform a decimation algorithm on at least a portion of the polygon mesh corresponding to one or more surfaces of the object. For example, because certain surfaces of an object when rendered may still appear realistic even when the number of vertices per given area are reduced, the mesh modification module 406 may reduce the number of vertices corresponding to one or more surfaces of the object. For instance, the mesh modification module 406 may reduce the number of vertices of a polygon mesh corresponding to at least a portion of the frames of a scanned pair of glasses.

In some embodiments, the symmetry module 408 may determine at least one symmetrical aspect of the object. For example, the symmetry module 408 may determine the left side of a pair of glasses is more or less symmetrical with the right side. Upon determining the symmetrical aspect of the object, the scanning module 302 may scan a portion of the object based on the determined symmetrical aspect. For example, the scanning module 302 may scan the left side of a pair of glasses, but not the right side. The polygon mesh module 306-a may generate a polygon mesh corresponding to the left side of the pair of glasses. In some configurations, the mirroring module 410 may mirror the result of scanning a symmetrical portion of the object in order to generate the portion of the polygon mesh that corresponds to a portion of the object not scanned. For example, the mirroring module 410 may mirror the generated polygon mesh of the left side of the pair of glasses in order to generate the polygon mesh of the right side of the pair of glasses. The polygon mesh module 306-a may merge the polygon meshes of left and right sides of the pair of glasses to generate a complete polygon mesh of the pair of glasses. Thus, the generated polygon mesh of an object may be positioned in relation to an image of a user in order to create a realistic rendered image of the user wearing and/or holding the object.

Figure 5:
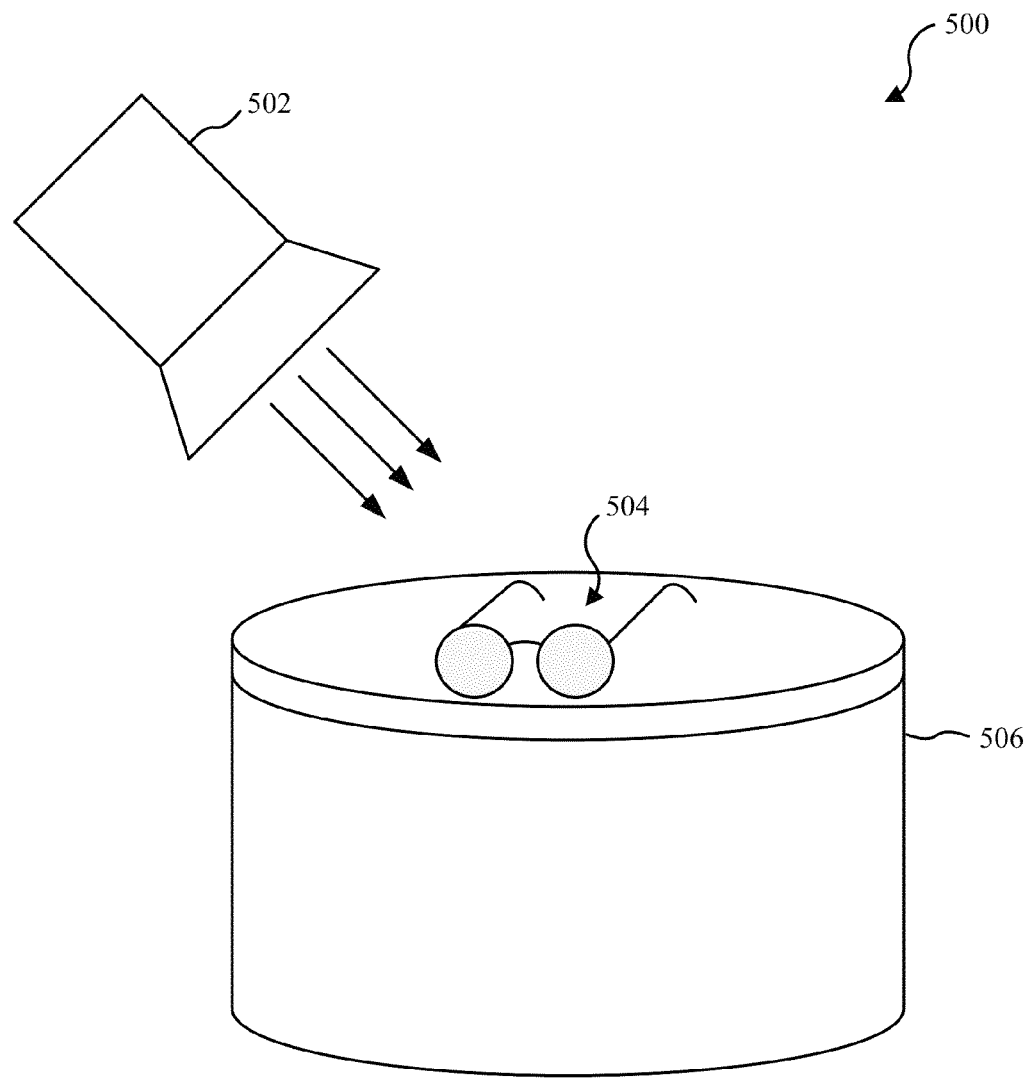
FIG. 5 illustrates an example arrangement for scanning an object.

FIG. 5 illustrates an example arrangement 500 for scanning an object 504. In particular, the illustrated example arrangement 500 may include a scanner 502, an object 504, and a display stand 506.

As depicted, the object 504 (e.g., a pair of glasses) may be placed on a display stand 506. In one embodiment, the scanner may scan the object in association with the scanning module 302. For instance, the scanner 502 may use a laser to perform a laser scan of the object. The polygon mesh module 302 may generate a polygon mesh of the object from the laser scan of the object. Additionally, or alternatively, the scanner 502 may use structured light to scan the object.

Figure 6:
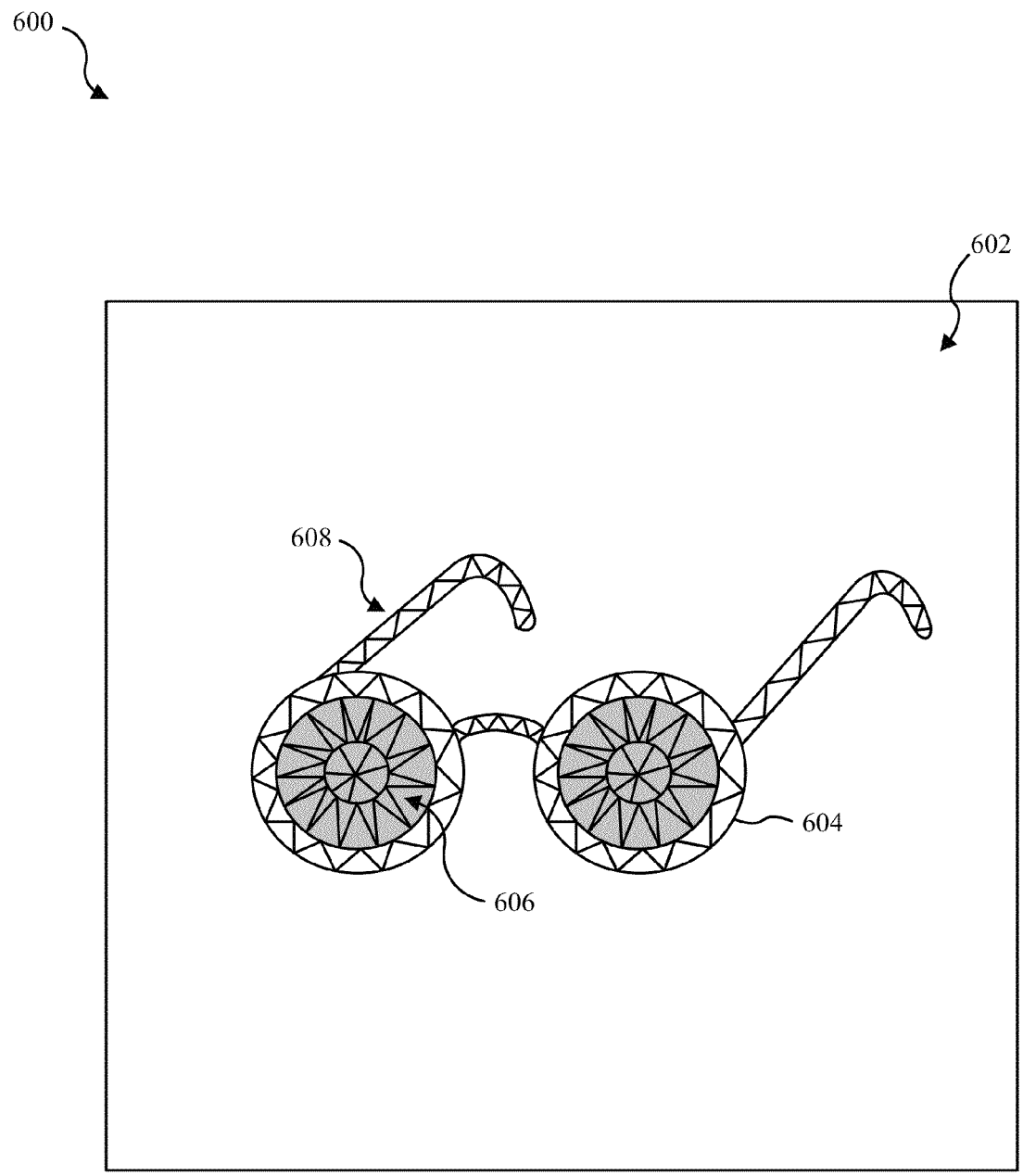
FIG. 6 illustrates an example arrangement of a virtual 3-D space.

FIG. 6 illustrates an example arrangement 600 of a virtual 3-D space 602. As depicted, the 3-D space 602 of the example arrangement 600 may include a 3-D model of an object 604 (e.g., a pair of glasses). In some embodiments, the 3-D model of the object 604 may include a polygon mesh model of the object, which may be stored in the database 110 as polygon data 112. The polygon data 112 of the 3-D model of the object may include 3-D polygon mesh elements such as vertices, edges, faces, polygons, surfaces, and the like. As depicted, the 3-D model of the object 604 may include a first surface 606 and a second surface 608. For example, a 3-D model of a pair of glasses may include a portion of the polygon mesh corresponding to the lenses and a portion of the polygon mesh corresponding to the frames. Additionally, or alternatively, the 3-D model of the object 604 may include at least one texture map, which may be stored in the database 110 as texture map data 114.

Figure 7:
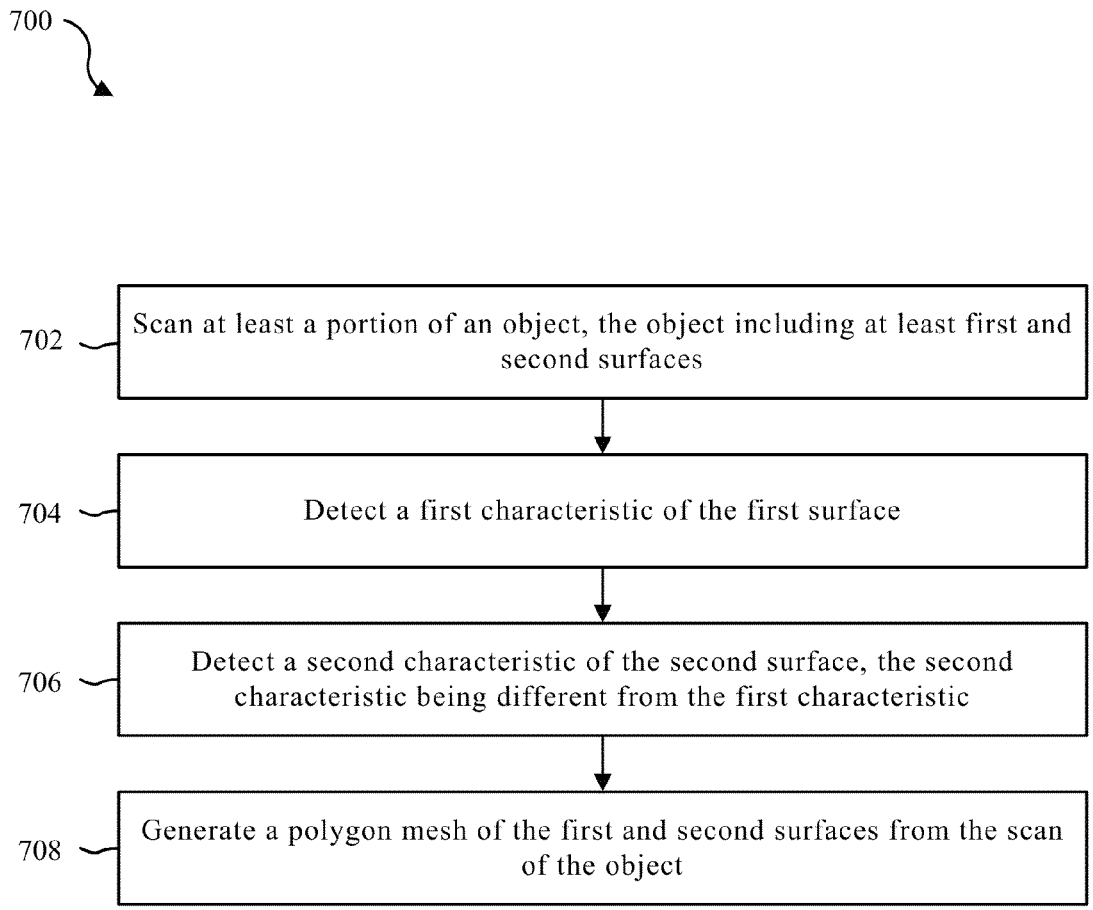
FIG. 7 is a flow diagram illustrating one embodiment of a method for generating a 3-D model of an object.

FIG. 7 is a flow diagram illustrating one embodiment of a method 700 for generating a 3-D model of an object. In some configurations, the method 700 may be implemented by the model generator 104 illustrated in FIGS. 1, 2, and/or 3. In some configurations, the method 700 may be implemented by the application 202 illustrated in FIG. 2.

At block 702, at least a portion of an object may be scanned. In some embodiments, the object may include at least first and second surfaces. At block 704, a characteristic of the first surface may be detected. At block 706, a characteristic of the second surface may be detected. As explained above, the object may include surfaces that are shiny, dull, matte, transparent, translucent, iridescent, opaque, metallic, smooth, and/or textured, etc. In some embodiments, the characteristic of the first surface may be different from the characteristic of the second surface. At block 708, a polygon mesh of each surface of the object may be generated from the scan of the object.

Figure 8:
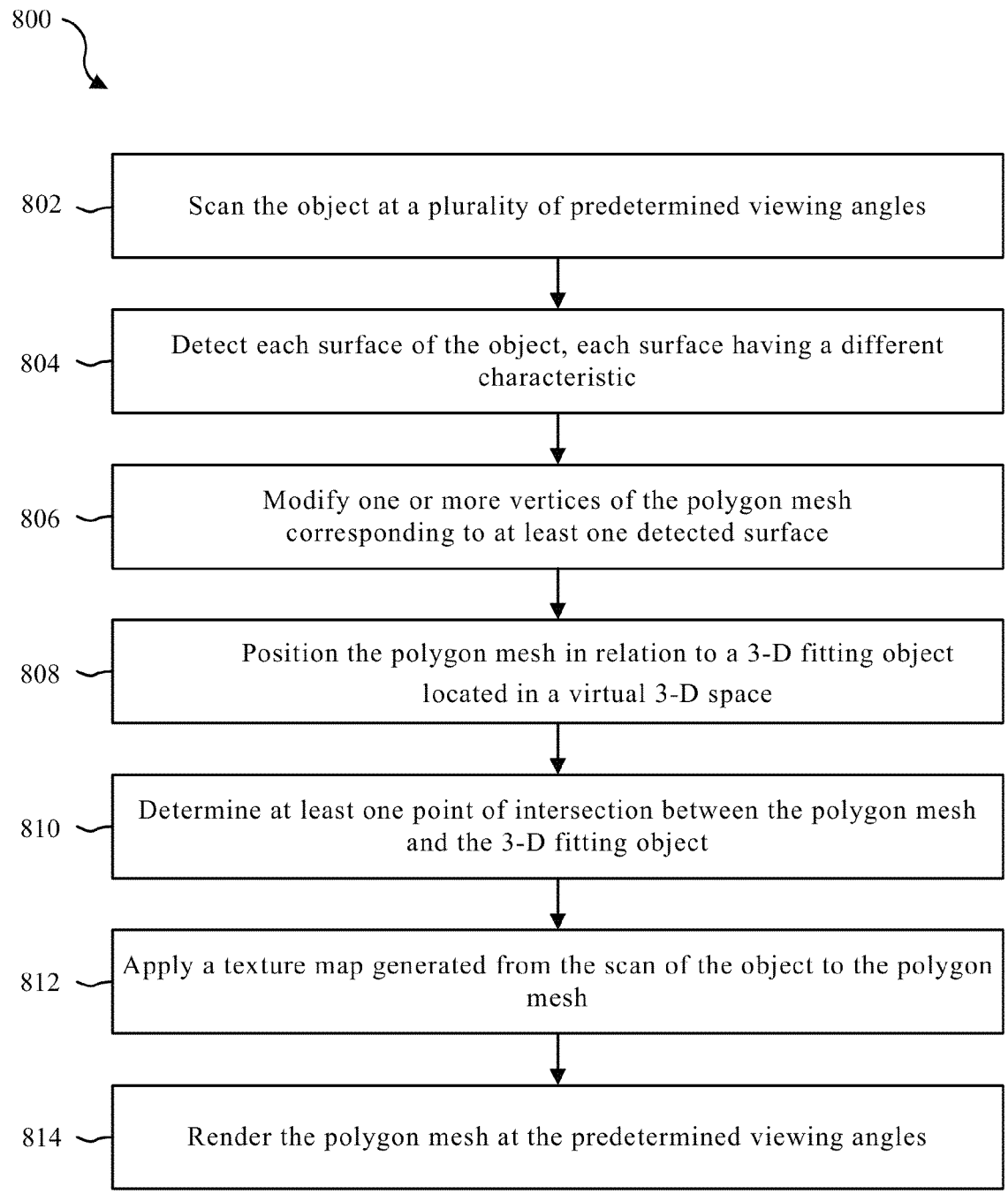
FIG. 8 is a flow diagram illustrating one embodiment of a method for rendering a polygon mesh.

FIG. 8 is a flow diagram illustrating one embodiment of a method 800 for rendering a polygon mesh. In some configurations, the method 800 may be implemented by the model generator 104 illustrated in FIGS. 1, 2, and/or 3. In some configurations, the method 800 may be implemented by the application 202 illustrated in FIG. 2.

At block 802, an object may be scanned at a plurality of predetermined viewing angles. At block 804, each surface of the object may be detected. In some configurations, each surface may have one or more different characteristics. At block 806, one or more vertices of the polygon mesh corresponding to at least one detected surface may be modified. The vertices may be modified to improve the simulation of a detected characteristic of one or more surfaces of the scanned object. In some embodiments, one or more vertices may be added to the polygon mesh corresponding to one or more surfaces detected on the object. For example, one or more edge-loops may be added to the polygon mesh. Additionally, or alternatively, one or more vertices may be removed from the polygon mesh. For example, a decimation algorithm may be performed on one or more surfaces of the polygon mesh.

At block 808, the polygon mesh may be positioned in relation to a 3-D fitting object located in a virtual 3-D space. In some embodiments, the 3-D fitting object may include a predetermined shape and size For example, a polygon mesh generated from scanning a pair of glasses may be positioned in relation to a 3-D model of a head in order to facilitate positioning and fitting the polygon mesh of the pair of glasses to a 3-D model of any user's head. At block 810, at least one point of intersection may be determined between the polygon mesh and the 3-D fitting object At block 812, a texture map generated from the scan of the object may be applied to the polygon mesh. In some embodiments, the texture map may include a plurality of images depicting the first and second surfaces of the object. The texture map may map a 2-D coordinate (e.g., UV coordinates) of one of the plurality of images depicting the first and second surfaces of the object to a 3-D coordinate (e.g., XYZ coordinates) of the generated polygon mesh of the object. At block 814, the polygon mesh may be rendered at the predetermined viewing angles. For example, a polygon mesh of a pair of glasses may be textured and rendered in relation to an image of a user in order to realistically simulate the user wearing the pair of glasses.

Figure 9:
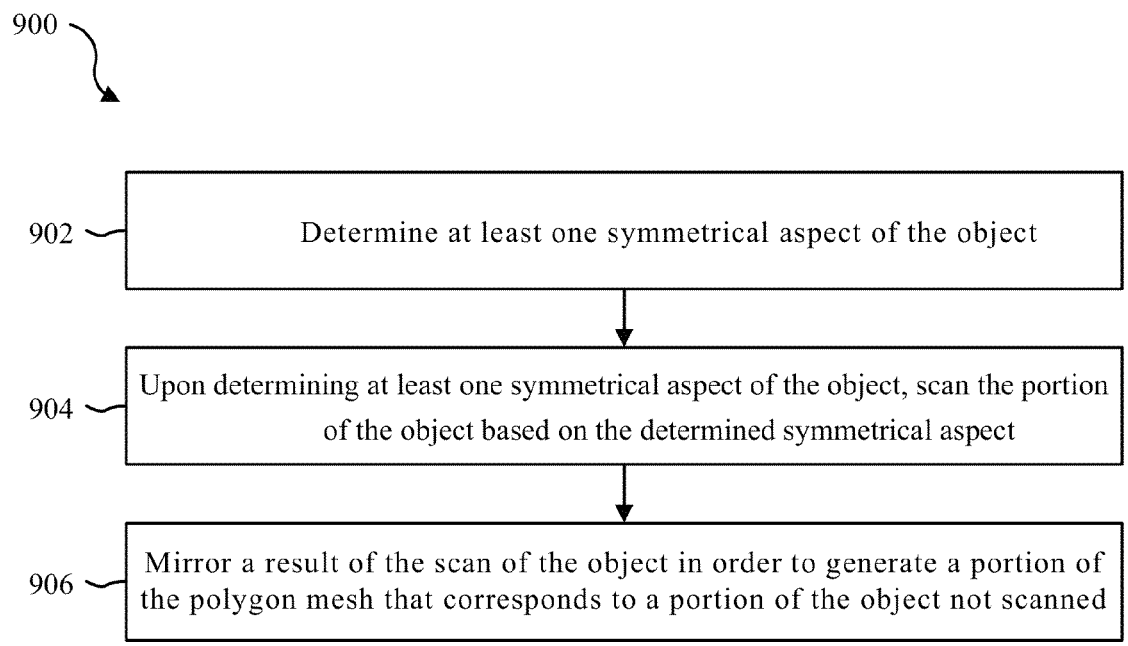
FIG. 9 is a flow diagram illustrating one embodiment of a method for scanning an object based on a detected symmetry of the object.

FIG. 9 is a flow diagram illustrating one embodiment of a method 900 for scanning an object based on a detected symmetry of the object. In some configurations, the method 900 may be implemented by the model generator 104 illustrated in FIGS. 1, 2, and/or 3. In some configurations, the method 900 may be implemented by the application 202 illustrated in FIG. 2.

At block 902, at least one symmetrical aspect of the object may be determined. Upon determining at least one symmetrical aspect of the object, at block 904, the portion of the object may be scanned based on the determined symmetrical aspect. At block 906, a result of the scan of the object may be mirrored in order to generate a portion of the polygon mesh that corresponds to a portion of the object not scanned.

Figure 10:
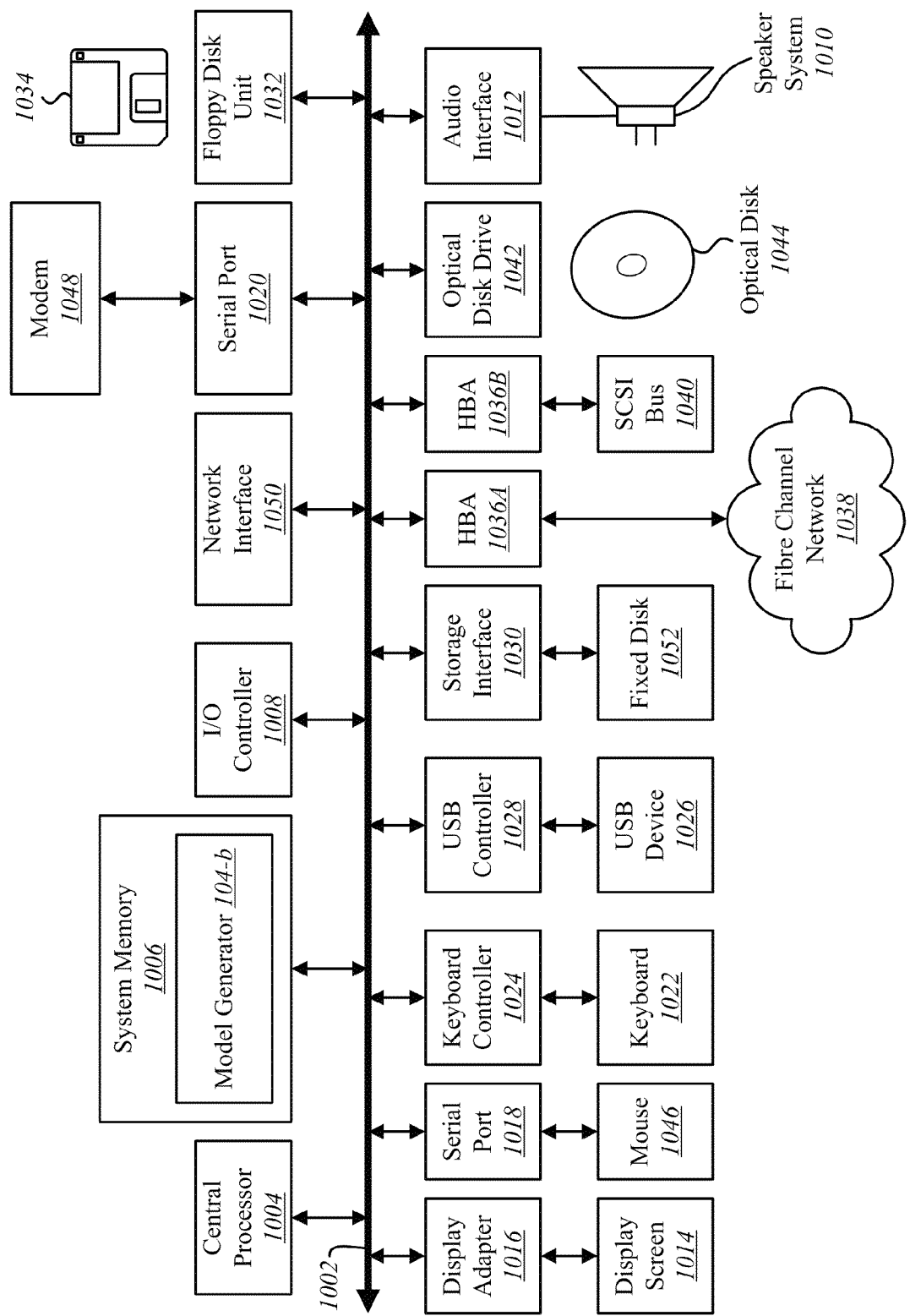
FIG. 10 depicts a block diagram of a computer system suitable for implementing the present systems and methods.

FIG. 10 depicts a block diagram of a computer system 1000 suitable for implementing the present systems and methods. The depicted computer system 1000 may be one example of a server 206 depicted in FIG. 2. Alternatively, the system 1000 may be one example of a device 102 depicted in FIGS. 1 and/or 2. Computer system 1000 includes a bus 1002 which interconnects major subsystems of computer system 1000, such as a central processor 1004, a system memory 1006 (typically RAM, but which may also include ROM, flash RAM, or the like), an input/output controller 1008, an external audio device, such as a speaker system 1010 via an audio output interface 1012, an external device, such as a display screen 1014 via display adapter 1016, serial ports 1018 and mouse 1046, a keyboard 1022 (interfaced with a keyboard controller 1024), multiple USB devices 1026 (interfaced with a USB controller 1028), a storage interface 1030, a host bus adapter (HBA) interface card 1036A operative to connect with a Fibre Channel network 1038, a host bus adapter (HBA) interface card 1036B operative to connect to a SCSI bus 1040, and an optical disk drive 1042 operative to receive an optical disk 1044. Also included are a mouse 1046 (or other point-and-click device, coupled to bus 1002 via serial port 1018), a modem 1048 (coupled to bus 1002 via serial port 1020), and a network interface 1050 (coupled directly to bus 1002).

Bus 1002 allows data communication between central processor 1004 and system memory 1006, which may include read-only memory (ROM) or flash memory, and/or random access memory (RAM), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a model generator 104-b to implement the present systems and methods may be stored within the system memory 1006. The model generator 104-b may be one example of the model generator 104 depicted in FIGS. 1, 2, and/or 3. Applications resident with computer system 1000 are generally stored on and accessed via a non-transitory computer readable medium, such as a hard disk drive (e.g., fixed disk 1052), an optical drive (e.g., optical drive 1042), or other storage medium. Additionally, applications can be in the form of electronic signals modulated in accordance with the application and data communication technology when accessed via network modem 1048 or interface 1050.

Storage interface 1030, as with the other storage interfaces of computer system 1000, can connect to a standard computer readable medium for storage and/or retrieval of information, such as a fixed disk drive 1052. Fixed disk drive 1052 may be a part of computer system 1000 or may be separate and accessed through other interface systems. Modem 1048 may provide a direct connection to a remote server via a telephone link or to the Internet via an internet service provider (ISP). Network interface 1050 may provide a direct connection to a remote server via a direct network link to the Internet via a POP (point of presence). Network interface 1050 may provide such connection using wireless techniques, including digital cellular telephone connection, Cellular Digital Packet Data (CDPD) connection, digital satellite data connection or the like.

Many other devices or subsystems may be connected in a similar manner (e.g., document scanners, digital cameras and so on). For example, the scanner 502 may connect to the computer system 1000 through the USB controller 1028, I/O controller 1008, network interface 1050, and/or other similar connections. Conversely, all of the devices shown in FIG. 10 need not be present to practice the present systems and methods. The devices and subsystems can be interconnected in different ways from that shown in FIG. 10. The operation of at least some of the computer system 1000 such as that shown in FIG. 10 is readily known in the art and is not discussed in detail in this application. Code to implement the present disclosure can be stored in a non-transitory computer-readable medium such as one or more of system memory 1006, fixed disk 1052, or optical disk 1044. The operating system provided on computer system 1000 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps may be performed in an order not illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for generating a three-dimensional (3-D) model of an object, the method comprising:

scanning, by a processor, at least a portion of an object, wherein the object includes at least first and second surfaces, the object comprising a pair of glasses, the first surface comprising at least a portion of a lens of the pair of glasses, and the second surface comprising at least a portion of a frame of the pair of glasses;

detecting, by the processor, an aspect of the first surface;

detecting, by the processor, an aspect of the second surface, the aspect of the second surface being different from the aspect of the first surface;

wherein detecting an aspect of the first or second surfaces comprises distinguishing, by the processor, between two or more surface finishes based on the scan of the object;

generating, by the processor, a polygon mesh of the first and second surfaces from the scan of the object to create a graphical representation of the scanned object;

adding, by the processor, a plurality of vertices to at least a portion of the polygon mesh corresponding to the first surface; and performing, by the processor, a decimation algorithm on at least a portion of the polygon mesh corresponding to the second surface, wherein adding the plurality of vertices and performing the decimation algorithm are performed simultaneously or sequentially as part of a single process;

wherein adding the plurality of vertices includes adding the vertices to the first surface and not adding vertices to the second surface, and wherein performing the decimation algorithm includes removing vertices from the second surface and not removing vertices from the first surface.

2. The method of claim 1, further comprising:
positioning the polygon mesh in relation to a 3-D fitting object in a virtual 3-D space, wherein the 3-D fitting object comprises a predetermined shape and size; and
determining at least one point of intersection between the polygon mesh and the 3-D fitting object.

3. The method of claim 1, further comprising:
modifying one or more vertices of the polygon mesh corresponding to the first surface to simulate the first surface, wherein distinguishing between two or more surface finishes based on the scan of the object includes detecting at least one of a matte finish, a glossy finish, an opacity, a transparency, and a texture.

4. The method of claim 1, further comprising:
determining at least one symmetrical aspect of the object;
upon determining the symmetrical aspect of the object, scanning the portion of the object based on the determined symmetrical aspect; and
mirroring a result of the scan of the object in order to generate a portion of the polygon mesh that corresponds to a portion of the object not scanned.

5. The method of claim 1, further comprising:
applying a texture map generated from the scan of the object to the polygon mesh, wherein the texture map includes a plurality of images depicting the first and second surfaces of the object, and wherein the texture map maps a two-dimensional (2-D) coordinate of one of the plurality of images depicting the first and second surfaces of the object to a 3-D coordinate of the generated polygon mesh of the object.

6. The method of claim 1, wherein scanning at least a portion of the object further comprises:
scanning the object at a plurality of predetermined viewing angles.

7. The method of claim 6, further comprising:
rendering the polygon mesh at the predetermined viewing angles.

8. A computing device configured to generate a three-dimensional (3-D) model of an object, comprising:
processor;
memory in electronic communication with the processor;
instructions stored in the memory, the instructions being executable by the processor to:
scan at least a portion of an object, wherein the object includes at least first and second surfaces, the object comprising a pair of glasses, the first surface comprising at least a portion of a lens of the pair of glasses, and the second surface comprising at least a portion of a frame of the pair of glasses;
detect an aspect of the first surface;
detect an aspect of the second surface, the aspect of the second surface being different from the aspect of the first surface;
wherein detecting an aspect of the first or second surfaces comprises distinguishing between two or more surface finishes based on the scan of the object;
generate a polygon mesh of the first and second surfaces from the scan of the object to create a graphical representation of the scanned object;
add a plurality of vertices to at least a portion of the polygon mesh corresponding to the first surface;
perform a decimation algorithm on at least a portion of the polygon mesh corresponding to the second surface, wherein adding the plurality of vertices and performing the decimation algorithm are performed simultaneously or sequentially as part of a single process; and
wherein adding the plurality of vertices includes adding the vertices to the first surface and not adding vertices to the second surface, and wherein performing the decimation algorithm includes removing vertices from the second surface and not removing vertices from the first surface.

9. The computing device of claim 8, wherein the instructions are executable by the processor to:
position the polygon mesh in relation to a 3-D fitting object in a virtual 3-D space, wherein the 3-D fitting object comprises a predetermined shape and size; and
determine at least one point of intersection between the polygon mesh and the 3-D fitting object.

10. The computing device of claim 8, wherein the instructions are executable by the processor to:
modify one or more vertices of the polygon mesh corresponding to the first surface to simulate the first surface, wherein distinguishing between two or more surface finishes based on the scan of the object includes detecting at least one of a matte finish, a glossy finish, an opacity, a transparency, and a texture.

11. The computing device of claim 8, wherein the instructions are executable by the processor to:
determine at least one symmetrical aspect of the object;
upon determining the symmetrical aspect of the object, scan the portion of the object based on the determined symmetrical aspect; and
mirror a result of the scan of the object in order to generate a portion of the polygon mesh that corresponds to a portion of the object not scanned.

12. The computing device of claim 8, wherein the instructions are executable by the processor to:
apply a texture map generated from the scan of the object to the polygon mesh, wherein the texture map includes a plurality of images depicting the first and second surfaces of the object, and wherein the texture map maps a two-dimensional (2-D) coordinate of one of the plurality of images depicting the first and second surfaces of the object to a 3-D coordinate of the generated polygon mesh of the object.

13. The computing device of claim 8, wherein the instructions are executable by the processor to:
scan the object at a plurality of predetermined viewing angles.

14. The computing device of claim 13, wherein the instructions are executable by the processor to:
render the polygon mesh at the predetermined viewing angles.

15. A computer-program product for generating a three-dimensional (3-D) model of an object, the computer-program product comprising a non-transitory computer-readable medium storing instructions thereon, the instructions being executable by a processor to:
scan at least a portion of an object, wherein the object includes at least first and second surfaces, the object comprising a pair of glasses, the first surface comprising at least a portion of a lens of the pair of glasses, and the second surface comprising at least a portion of a frame of the pair of glasses;

detect an aspect of the first surface;
detect an aspect of the second surface, the aspect of the second surface being different from the aspect of the first surface;
wherein detecting an aspect of the first or second surfaces comprises distinguishing between two or more surface finishes based on the scan of the object;
generate a polygon mesh of the first and second surfaces from the scan of the object to create a graphical representation of the scanned object;
add a plurality of vertices to at least a portion of the polygon mesh corresponding to the first surface;
perform a decimation algorithm on at least a portion of the polygon mesh corresponding to the second surface, wherein adding the plurality of vertices and performing the decimation algorithm are performed simultaneously or sequentially as part of a single process; and
wherein adding the plurality of vertices includes adding the vertices to the first surface and not adding vertices to the second surface, and wherein performing the decimation algorithm includes removing vertices from the second surface and not removing vertices from the first surface.

16. The computer-program product of claim 15, wherein the instructions are executable by the processor to:
position the polygon mesh in relation to a 3-D fitting object in a virtual 3-D space, wherein the 3-D fitting object comprises a predetermined shape and size;
determine at least one point of intersection between the polygon mesh and the 3-D fitting object; and
render the polygon mesh at predetermined viewing angles.

* * * * *